TERNARY RECORDING AND REPRODUCING APPARATUS

Filed Aug. 2, 1963 3 Sheets-Sheet 1

INVENTOR.
JOHN P. LARKIN
BY Percy P. Lantzy
ATTORNEY

May 12, 1964 J. P. LARKIN 3,133,274

TERNARY RECORDING AND REPRODUCING APPARATUS

Filed Aug. 2, 1963 3 Sheets-Sheet 2

INVENTOR.
JOHN P. LARKIN

BY [signature]

ATTORNEY

INVENTOR.
JOHN P. LARKIN
BY Percy P. Lantzy
ATTORNEY

3,133,274
TERNARY RECORDING AND REPRODUCING APPARATUS

John P. Larkin, Edison, N.J., assignor to International Telephone and Telegraph Corporation, Nutley, N.J., a corporation of Maryland Filed Aug. 2, 1963, Ser. No. 299,633
15 Claims. (Cl. 340—174.1)

This invention relates to apparatus for recording and reproducing information which occurs in ternary form. Apparatus for recording and reproducing information in binary form is well known, such information having either of two values which may be designated "1" or "0." For example, magnetic recording devices for binary information operate by virtue of the fact that tiny areas of a magnetic surface may be magnetized in either of two directions. An area magnetized in the plus direction may represent "1," and in the minus direction, "0." Magnetic drums or tapes are generally used for the storage medium.

There are three primary methods of magnetic recording: NRZ recording consists of magnetizing segments of the drum or tape in one direction for a "1" and in the opposite direction for a "0." NRZ1 recording consists of a reversal of the magnetization to store a "1" and the absence of a reversal to store a "0." The reversal can be in either direction. If magnetization in one direction is designated "plus" and magnetization in the other direction is designated "minus," the shift or transition from "minus" to "plus" or from "plus" to "minus" will represent a "1," while the absence of any shift will represent a "0." Phase modulation occurs when a shift in one direction is represented by a "1" and a shift in the other direction is represented by a "0."

Information in the ternary form has three different potential values which may be designated "2," "1," or "0."

It is the principal object of this invention to provide a simple and easily constructed apparatus for recording and reproducing information in ternary form, such as ternary pulse code modulation.

Another object of the invention is to provide an apparatus which will be able to record and reproduce information in the ternary form by certain combinations of devices which are well known in connection with the recording and reproduction of information in the binary form.

Other objects and objects relating to the construction and arrangement of the circuit units will appear as the description of the invention proceeds.

The invention is illustrated in the accompanying drawings, in which.

The invention is accomplished by combining phase modulation with NRZ1 modulation. A "2" is represented by a reversal of magnetization in one direction, say minus to plus, a "1" by a reversal in the opposite direction, say plus to minus, and a "0" by the absence of reversal.

Figure 1:
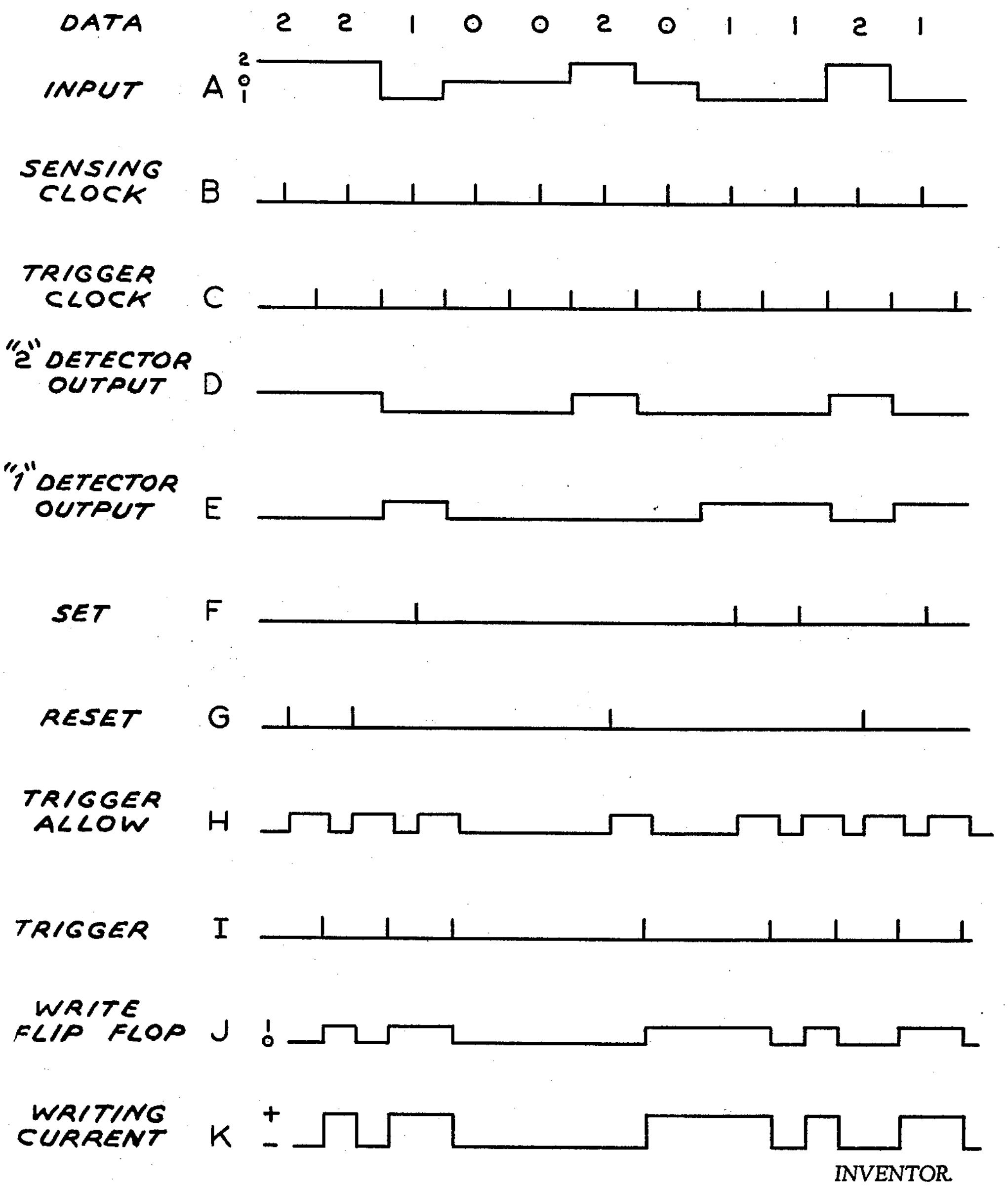
FIGURE 1 is a diagram of waveforms, called "writing waveforms," which may be found at various parts of the writing circuit used in recording the information in the storage medium.
Figure 3:
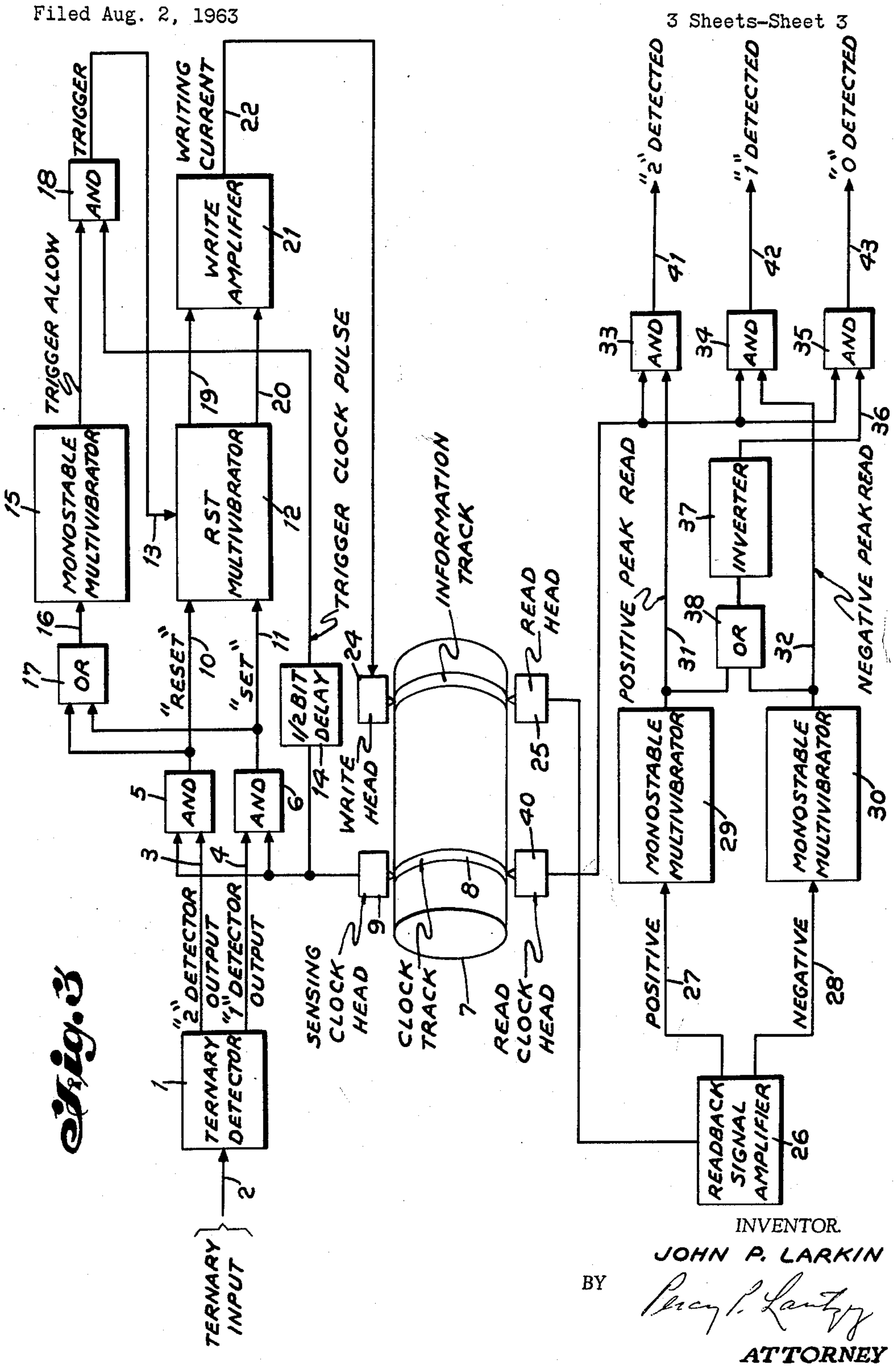
FIGURE 3 is a block diagram of the complete recording and reproducing apparatus of the invention.

Referring now to FIGURES 1 and 3, the manner of recording the ternary information will first be described. The ternary signal is received by a ternary detector 1 over an input lead 2. This data input signal may have a waveform as represented by line A in FIGURE 1. It comprises the three values: "2," "1," and "0," represented respectively by a positive level, a negative level, and a zero level between the two. This information may be received over a single input, as indicated, or there might be three inputs, one for each of the different values.

The ternary detector may be any well known circuit with two outputs 3 and 4 which will separate positive voltage levels from the negative levels and produce them both as positive values. Thus, the output 3 will carry positive "2" pulses corresponding to the positive values in the input signal, as is represented by line D of FIGURE 1, while output 4 will carry positive "1" pulses corresponding to the negative values in the input signal, as is represented by line E of FIGURE 1.

The output 3 of the ternary detector 1 is connected to one input of an AND gate 5, and the output 4 is connected to one input of an AND gate 6. These AND gates are opened to pass the signals from the outputs 3 or 4 at short intervals of time, preferably at about the midpoints of the information bits. To this end a succession of sensing clock pulses are produced which are indicated on line B of FIGURE 1. These sensing clock pulses may be produced in any desired manner as long as they are synchronized with the information bits being received by the ternary detector 1.

In order to illustrate the invention I have shown a magnetic drum 7 as the storage medium, although it will be understood that magnetic tapes or other storage devices may be used, as desired. A clock track 8 on the drum has the sensing pulse prerecorded thereon, and a sensing clock head 9 is arranged to read the clock pulses from the track as the drum is rotated by a suitable motor, not shown. A second input of each of the AND gates 5 and 6 is connected to the output of the sensing clock head 9, so that either of the gates will open at the time of the sensing pulse if the associated detector output 3 or 4 is energized at that time.

The outputs of the two AND gates 5 and 6 are connected respectively to two inputs 10 and 11 (indicated as "Reset" and "Set") of an RST multivibrator 12. The "Set" pulse for the data of line A, FIGURE 1, is indicated on line F of that figure, while the "Reset" pulse is indicated on line G. This multivibrator is a well known bistable type having three inputs and two outputs. When the input 10 is energized, the multivibrator is set to one condition, while energization of the input 11 sets it to the other condition. The third input 13, when energized, has the effect of shifting the multivibrator from whichever condition it is in to the other condition.

When the sensing pulse occurs either one, or neither, of the outputs 3 and 4 of the ternary detector 1 will be energized, depending on the potential level of the received signal. If the output 3 is energized, and the AND gate 5 will pass a "Reset" signal to the input 10 of the RST multivibrator which will be set to the minus condition. If the output 4 is energized, the AND gate 6 will pass a "Set" singal to the input 11 of the RST multivibrator 12 to set it to the plus condition. A subsequent energization of the third input 13 will then shift the condition of the multivibrator, but if there is no subsequent energization of the third input, there will be no shift.

The writing current is obtained by amplifying the outputs of the multivibrator 12 and producing current in one direction when the multivibrator is "Set" and in the other direction when it is "Reset."

In order to accomplish this, a succession of trigger clock pulses is produced which are delayed approximately one-half the time of one bit from the sensing pulses. These trigger clock pulses are indicated on line C of FIGURE 1. They may be produced in any desired manner, but a convenient way is to apply the sensing pulse from the sensing clock head 9 to a one-half bit delay circuit 14 and obtain the trigger clock pulses from the delay circuit.

It is now necessary to apply the trigger clock pulse to the third input 13 of the RST multivibrator if either a "2" or a "1" signal has been received, or to surpress it if a "0" signal has been received. To this end I provide a monostable multivibrator 15 and connect its single input to the output of an OR gate 17 which has two inputs connected respectively to the outputs of the AND gates 5 and 6. With this arrangement, the monostable multivibrator 15 will be shifted to its unstable condition when either of the AND gates produces a signal, but it will not be so shifted when neither of these AND gates produces a signal, which would be the case if the received signal was a "0."

The output of the monostable multivibrator 15 is connected to one input of an AND gate 18 to the other input of which is applied the trigger clock pulse from the delay circuit 14. The output of the AND gate 18 carries the trigger pulse, shown on line I of FIGURE 1, and is connected to the third input 13 of the RST multivibrator 12. At the time of the trigger clock pulse, if the monostable multivibrator 15 is in its unstable condition, producing a trigger-allow pulse, as shown on line H of FIGURE 1, the AND gate 18 will apply the trigger pulse to the third input 13 of the RST multivibrator 12, with the result that it will shift from the condition to which it has been set to the other condition. For instance, if it has been set to the minus condition by a received "2" signal, it will shift from a minus to plus and will thus produce a signal on an output 19. The condition of the RST multivibrator 12 is indicated on line J of FIGURE 1. A shift in the other direction will produce a signal on the other output 20.

The two outputs 19 and 20 are connected to the corresponding inputs of a write amplifier 21 which is arranged to produce a current as shown on line K of FIGURE 1 in response to the received data input of line A.

The output of the write amplifier 21 is delivered over the lead 22 to a write head 24 which is arranged to effect the magnetization of the drum surface in a well known manner in accordance with the write signal.

Figure 2:
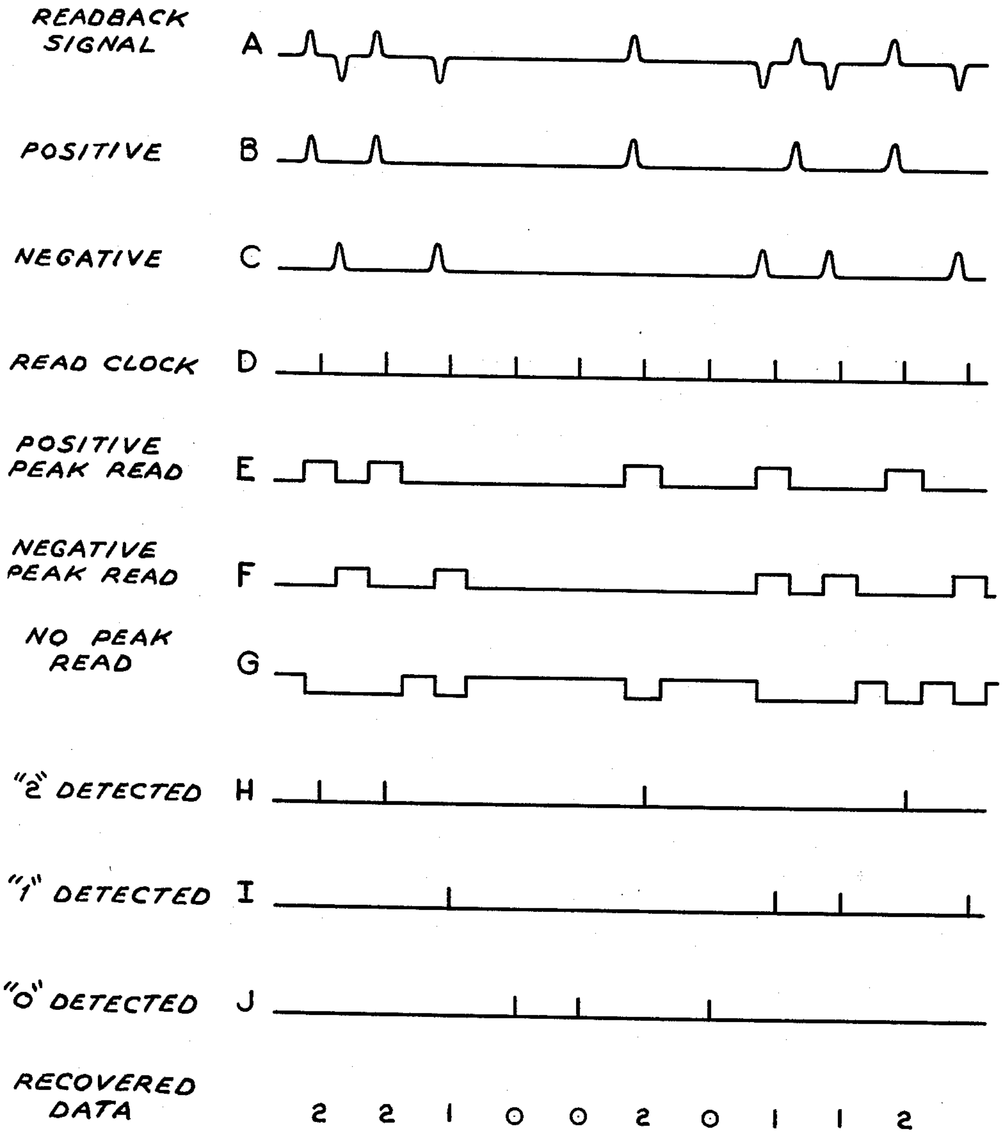
FIGURE 2 is a diagram of waveforms, called "reading waveforms," which may be found at various points in the reading circuit used in reproducing the information from the storage medium.

It will be seen on line A of FIGURE 2 that with the arrangement of the invention, the track on the drum surface will have transitions in its magnetization from plus to minus or minus to plus in accordance with the "2" or "1" values of the received signal, but will not have any transitions at all in response to a "0" signal.

The manner of reproducing the recorded information will now be described with reference to FIGURES 2 and 3.

A read head 25 is provided to read the recorded signals from the drum. These signals will appear as indicated on line A of FIGURE 2. This read head is connected to a readback signal amplifier 26 which has two outputs 27 and 28 and is adapted to energize the output 27 when positive pulses appear in the signal from the read head 25, as indicated on line B of FIGURE 2, and to energize the output 28 when negative pulses appear in the signal, as indicated on line C. The pulses on both outputs 27 and 28 are in the positive direction.

The output 27 is connected to the input of a monostable multivibrator 29 and the output 28 is connected to the input of a monostable multivibrator 30. Both multivibrators are arranged to remain in their unstable conditions for a period of time less than the duration of one bit of the information taken from the drum. Multivibrator 29 will produce positive pulses on its output 31 corresponding to positive peak read signals as shown on line E of FIGURE 2, while multivibrator 30 will produce positive pulses on its output 32 which correspond to negative peak read signals, as shown on line F of FIGURE 2.

In order to produce the three output signals for the value "2," "1," and "0," I provide three AND gates 33, 34, and 35, respectively. AND gate 33 has one input connected to the positive peak read output 31 of multivibrator 29. AND gate 34 has one input connected to the negative peak read output 32 of multivibrator 30. The third AND gate 35 has an input 36 which is caused to be energized when both multivibrators 29 and 30 are in their stable condition which would be the case when no signal has been read from the drum.

This is accomplished by means of inverter 37 whose output is connected to the input 36 of the AND gate 35. The input of the inverter is connected through an OR gate 38 to the outputs 31 and 32 of the multivibrators 29 and 30. When either of these multivibrators is in its unstable condition, the positive signal on its output will be inverted by the inverter 37 to produce a negative level on the input 36 of the AND gate 35 and the gate will be disabled. When, however, both of the multivibrators are in their stable states, as a result of no signal being read by the read head 25, then the inverter will produce a positive level which will be applied to the AND gate 35.

In order to give the multivibrators 29 and 30 time to assume their unstable conditions before energization of the output circuits, I provide a succession of read clock pulses which will occur at about the midpoints of the information bits read from the drum. This read clock pulse is indicated on line D of FIGURE 2 and may be produced in any desired manner as long as it is synchronized with the bits being read from the storage medium. A convenient manner of producing it, however, is to utilize the prerecorded clock track 8 on the drum and to provide a read clock head 40 arranged to read the read clock pulses from the track. This read clock head is connected to a second input of each of the AND gates 33, 34, and 35. When the read clock pulse occurs, whichever one of the gates 33, 34, and 35 that has its other input energized will be opened, so that a positive pulse will appear on its output. These outputs for the three gates have been indicated at 41, 42, and 43, respectively, and the signals appearing thereon for the data used in this description are indicated on lines H, I, and J, respectively. These pulses represent the data indicated on line K.

From the above it will be seen that I have provided a simple apparatus for recording and reproducing ternary information, as, for instance, ternary pulse code modulation, using circuit units which are well known in recording and reproducing binary information. While I have shown the invention applied specifically to magnetic recording, it will be understood that it may also be used with other storage media. I do not, therefore, wish to limit the invention to what has been shown and described except as such limitations appear in the appended claims.

What I desire to claim and secure by Letters Patent is:

1. Apparatus for recording and reproducing ternary information comprising:

(*a*) means for receiving ternary information signals in the form of a succession of electrical bits of equal time duration and having any of three different potential levels, (*b*) means for producing a succession of sensing pulses at the same rate as said received bits but of less time duration than said bits, each of said sensing pulses occurring within the limits of the corresponding bit, (*c*) first generating means connected to said receiving means and to said sensing-pulse-producing means for generating at the time of said sensing pulse, a first signal corresponding to portions of said ternary signals above a predetermined potential, (*d*) second generating means connected to said receiving means and to said sensing-pulse-producing means for generating at the time of said sensing pulse, a second signal corresponding to portions of said information signal below a predetermined potential, (*e*) a trigger-clock-pulse-producing means for producing a succession of trigger clock pulses at the same rate as said sensing pulses but spaced in time therefrom, (f) trigger pulse generating means connected to said first and second generating means and to said trigger-clock-pulse-producing means for generating a trigger pulse at the time of said trigger clock pulse if, and only if, a signal has been generated by either of said first and second generating means, (g) writing-signal-producing means connected to said first and second signal generating means and to said trigger-pulse-generating means and adapted to be set in one condition by a signal generated by said first signal generating means and in another condition by a signal generated by said second signal generating means and to be shifted at the time of said trigger pulse from whichever condition it is in to the other condition, (h) means for causing said writing-signal-producing means to produce a writing signal of one polarity when its condition is shifted at the time of said trigger pulse in one sense and to produce a writing signal of the other polarity when its condition is shifted at the time of said trigger pulse in the other sense, (i) a storage device, (j) means for storing the writing signals produced by said writing-signal-producing means in succession in said storage device, (k) means for reading stored signals in succession from said storage device at a constant rate, (l) first output-signal-producing means connected to said reading means for producing a signal of a predetermined time duration each time said reading means reads a signal of one polarity, (m) second output-signal-producing means also connected to said reading means for producing a signal of a predetermined time duration each time said reading means reads a signal of the other polarity, (n) third output-signal-producing means also connected to said reading means for producing a signal of a predetermined time duration whenever no signal is read by said reading means, (o) means for producing a succession of read pulses at the rate at which the recorded signals are read from said storage device, (p) a first output circuit, (q) means connected to said first output-signal-producing means and to said read-pulse producing means for transferring a signal on said first output-signal-producing means to said first output circuit at the time of said read pulse, (r) a second output circuit, (s) means connected to said second output-signal-producing means and to said read-pulse producing means for transferring a signal on said second output-signal producing means to said second output circuit at the time of said read pulse, (t) a third output circuit, and (u) means connected to both said first and second output-signal-producing means and to said read-pulse-producing means for producing a signal on said third output circuit at the time of said read pulse if no signal is produced by either of said first or said second output-signal-producing means.

2. Apparatus for recording and reproducing ternary information, as defined in claim 1, in which the trigger pulse generating means comprises:

(a) a monostable multivibrator, (b) means for causing said monostable multivibrator to assume its unstable condition when signals are received by the receiving means at either the highest or the lowest level but not the intermediate level, and (c) means connected to the monostable multivibrator and to the trigger-clock-pulse-producing means for generating the trigger pulse when said monostable multivibrator is in its unstable condition at the time of the trigger clock pulse.

3. Apparatus for recording and reproducing ternary information, as defined in claim 2, in which the first and second output-signal-producing means comprise monostable multivibrators, the first adapted to assume its unstable condition when a signal having a potential above a predetermined potential is read by the reading means and the second adapted to assume its unstable condition when a signal below a predetermined potential is read by said reading means, and in which the means for producing a signal on the third output circuit comprises an inverter connected to the outputs of both monostable multivibrators and adapted to produce an output signal only when neither of said monostable multivibrators is in its unstable condition.

4. Apparatus for recording and reproducing ternary information, as defined in claim 3, in which the storage device is a magnetic storage device.

5. Apparatus for recording and reproducing ternary information, as defined in claim 4, in which the storage device is a magnetic drum and the means for producing the sensing clock pulses and the reading clock pulses are prerecorded in track form on said drum.

6. Apparatus for recording ternary information comprising:

(a) means for receiving ternary information signals in the form of a succession of electrical bits of equal time duration and having any of three different potential levels, (b) means for producing a succession of sensing pulses at the same rate as said received bits but of less time duration than said bits, each of said sensing pulses occurring within the limits of the corresponding bit, (c) first generating means connected to said receiving means and to said sensing-pulse-producing means for generating, at the time of said sensing pulse, a first signal corresponding to portions of said ternary signals above a predetermined potential, (d) second generating means connected to said receiving means and to said sensing-pulse-producing means for generating, at the time of said sensing pulse, a second signal corresponding to portions of said information signal below a predetermined potential, (e) a trigger-clock-pulse-producing means for producing a succession of trigger clock pulses at the same rate as said sensing pulses but spaced in time therefrom, (f) trigger-pulse-generating means connected to said first and second generating means and to said trigger-clock-pulse-producing means for generating a trigger pulse at the time of said trigger clock pulse if, and only if, a signal has been generated by either of said first and second generating means, (g) writing-signal-producing means connected to said first and second signal-generating means and to said trigger-pulse-generating means and adapted to be set in one condition by a signal generated by said first signal-generating means and in another condition by a signal generated by said second signal-generating means and to be shifted by said trigger pulse from whichever condition it is in to the other condition, (h) a storage device, and (i) means for storing the writing signals produced by said writing-signal-producing means in succession in said storage device.

7. Apparatus for recording ternary information, as defined in claim 6, in which the trigger-pulse-generating means comprises:

(a) a monostable multivibrator, (b) means for causing said monostable multivibrator to assume its unstable condition when signals are received by the receiving means at either the highest or the lowest level but not the intermediate level, and (c) means connected to the monostable multivibrator and to the trigger-clock-pulse-producing means for generating the trigger-pulse when said monostable multivibrator is in its unstable condition at the time of the trigger clock pulse.

8. Apparatus for recording ternary information, as defined in claim 7, in which the storage device is a magnetic storage device.

9. Apparatus for recording ternary information, as defined in claim 8, in which the storage device is a magnetic drum and the means for producing the sensing clock pulses comprises a track on the drum.

10. Apparatus for reproducing ternary information recorded in a storage device as a succession of electrical bits of equal time duration and representing signals of either of two opposite polarities or no signal comprising:

(a) means for reading the stored signals in succession from said storage device at a constant rate, (b) first output-signal-producing means connected to said reading means for producing a signal of a predetermined time duration each time said reading means reads a signal of one polarity, (c) second output-signal-producing means also connected to said reading means for producing a signal of a predetermined time duration each time said reading means reads a signal of the other polarity, (d) third output-signal-producing means also connected to said reading means for producing a signal of a predetermined time duration whenever no signal is read by said reading means, (e) means for producing a succession of read pulses at the rate at which the recorded signals are read from said storage device, (f) a first output circuit, (g) means connected to said first output-signal-producing means and to said read-pulse-producing means for transferring a signal on said first output-signal-producing means to said first output circuit at the time of said read pulse, (h) a second output circuit, (i) means connected to said second output-signal-producing means and to said read-pulse-producing means for transferring a signal on said second output-signal producing means of said second output circuit at the time of said read pulse, (j) a third output circuit, and (k) means connected to both said first and second output-signal-producing means and to said read-pulse-producing means for producing a signal on said third output circuit at the time of said read pulse if no signal is produced by either of said first or said second output-signal-producing means.

11. Apparatus for reproducing ternary information, as defined in claim 10, in which the first and second output-signal-producing means comprise monostable multivibrators, the first adapted to assume its unstable condition when a signal having a potential above a predetermined potential is read by the reading means and the second adapted to assume its unstable condition when a signal having a potential below a predetermined potential is read by said reading means, and in which the means for producing a signal on the third output circuit comprises an inverter connected to the outputs of both monostable multivibrators and adapted to produce an output signal only when neither of said monostable multivibrators is in its unstable condition.

12. Apparatus for reproducing recorded ternary information, as defined in claim 11, in which the means for producing signals on the three output circuits comprises three AND gates to the outputs of which the output circuits are respectively connected, one input of the first gate being connected to the output of the first monostable multivibrator, one input of the second gate being connected to the output of the second monostable multivibrator, and one input of the third gate being connected to the output of the inverter, the other input of each gate being connected in parallel to the means for producing the read clock pulses.

13. A ternary information recording and reproducing apparatus comprising:

(a) a storage device capable of storing either of two values, (b) ternary detector means adapted to receive ternary signals and having two outputs one of which is adapted to carry a signal corresponding to potentials in the ternary signal above a predetermined value and the other is adapted to carry a signal corresponding to potentials in the ternary signal below a predetermined value, (c) means for producing a sensing clock pulse at a predetermined rate, (d) an RST multivibrator having two conditions of stability, a first input adapted when energized to set it at one condition of stability, a second input adapted when energized to set it at the other condition of stability, and a third input adapted when energized to shift it from whatever condition it is in to the other condition, and said multivibrator having a first output adapted to be energized when it is in said one condition, and a second output adapted to be energized when it is in said other condition, (e) means controlled by said sensing-clock-producing means for transferring the signal on either of said outputs of said ternary detector means to the corresponding input of said multivibrator at the time of said sensing clock pulse, (f) means for producing a trigger clock pulse at a time after said sensing pulse which is less than the time between two of said sensing pulses, (g) a monostable multivibrator, (h) means for causing said monostable multivibrator to shift to its unstable condition at the time of said sensing clock pulse whenever a signal appears on either of the outputs of said ternary detector at that time, (i) means controlled by said trigger-clock-pulse-producing means for energizing said third input of said RST multivibrator at the time of said trigger clock pulse when and only when said monostable multivibrator is in its unstable condition, whereby said RST multivibrator will be shifted from the condition at which it has been set at the time of said sensing pulse to its other condition, but it will not be shifted at all if no signal appears on either of the outputs of said ternary detector at the time of said sensing pulse, (j) means connected to the outputs of said RST multivibrator for feeding a current of one polarity into said storage device when said multivibrator is shifted in one direction and feeding a current of the other polarity into said storage device when said multivibrator is shifted in the other direction, (k) means for producing a succession of read clock pulses at a predetermined rate, (l) reading means for reading the information recorded in said storage device and adapted to generate current of one polarity or the other depending on the polarity of the current fed into said device and at a rate corresponding to the read clock pulse rate, (m) a first read lead, (n) means for energizing said first lead when current of one polarity is generated by said reading means, (o) a second read lead, (p) means for energizing said second lead when current of the other polarity is generated by said reading means, (q) a first output circuit, (r) means for energizing said first output circuit at the time of said read clock pulse when said first read lead is energized, (s) a second output circuit, (t) means for energizing said second output circuit at the time of said read clock pulse when said second read lead is energized, (u) a third output circuit, and (v) means for energizing said third output circuit at the time of said read clock pulse when neither said first or second read lead is energized.

14. A ternary information recording and reproducing apparatus, as defined in claim 13, in which the storage device is a magnetic storage device.

15. A ternary information recording and reproducing apparatus, as defined in claim 14, in which the storage device is a magnetic drum.

No references cited.